United States Patent
Lynch

(10) Patent No.: US 12,449,883 B2
(45) Date of Patent: *Oct. 21, 2025

(54) ELECTRONICS MODULE FOR A WEARABLE DEVICE

(71) Applicant: Prevayl Innovations Limited, Manchester (GB)

(72) Inventor: Michael John Lynch, Cheshire (GB)

(73) Assignee: Prevayl Innovations Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/997,687

(22) PCT Filed: May 5, 2021

(86) PCT No.: PCT/GB2021/051088
§ 371 (c)(1),
(2) Date: Nov. 1, 2022

(87) PCT Pub. No.: WO2021/224619
PCT Pub. Date: Nov. 11, 2021

(65) Prior Publication Data
US 2023/0096555 A1  Mar. 30, 2023

(30) Foreign Application Priority Data
May 7, 2020 (GB) .................................... 2006830

(51) Int. Cl.
*G06F 1/32* (2019.01)
*G06F 1/3215* (2019.01)
*G06F 1/3231* (2019.01)

(52) U.S. Cl.
CPC .......... *G06F 1/3215* (2013.01); *G06F 1/3231* (2013.01)

(58) Field of Classification Search
CPC ...................................................... G06F 1/32
See application file for complete search history.

(56) References Cited

U.S. PATENT DOCUMENTS 9,513,703 B2  12/2016  Whitney
10,154,460 B1  12/2018  Miller
(Continued)

FOREIGN PATENT DOCUMENTS

| | | |
|---|---|---|
| EP | 3506052 | 7/2019 |
| GB | 2585753 | 1/2021 |
| GB | 2594820 | 11/2021 |

OTHER PUBLICATIONS

International Search Report received in PCT/GB2021/051088 dated Jul. 20, 2021.
(Continued)

*Primary Examiner* — Paul B Yanchus, III
(74) *Attorney, Agent, or Firm* — Suzannah K. Sundby, Esq.; Canady + Lortz LLP

(57) ABSTRACT

The electronics module (100) comprises a controller (103). The controller (103) is arranged to operate in a first power mode and a second power mode. The first power mode consumes less power than the second power mode. The controller (103) is arranged to transition from the first power mode to the second power mode in response to an input unit of the electronics module (100) detecting an input event. In the second power mode, the controller (103) is arranged to receive a signal from a sensing unit of the wearable article, determine from the signal whether the wearable article is being worn. In response to determining that the wearable article is not being worn, the controller (103) is arranged to transition from the second power mode to the first power mode.

15 Claims, 6 Drawing Sheets

(56) References Cited

U.S. PATENT DOCUMENTS

| | | | |
|---|---|---|---|
| 12,130,686 B2 * | 10/2024 | Lynch | G06F 1/163 |
| 2003/0149349 A1 | 8/2003 | Jensen | |
| 2010/0277304 A1 * | 11/2010 | Haartsen | G06F 1/3215 |
| | | | 455/343.2 |
| 2013/0072765 A1 | 3/2013 | Kahn | |
| 2013/0314365 A1 * | 11/2013 | Woolley | H03K 17/941 |
| | | | 345/174 |
| 2014/0239982 A1 | 8/2014 | Alameh | |
| 2015/0145671 A1 | 5/2015 | Cohen | |
| 2016/0026212 A1 | 1/2016 | Lee | |
| 2016/0041048 A1 | 2/2016 | Blum | |
| 2016/0363957 A1 | 12/2016 | Stroetmann | |
| 2017/0045928 A1 | 2/2017 | Ishikawa | |
| 2017/0331901 A1 * | 11/2017 | Sarlandie de La Robertie | |
| | | | G06F 1/163 |
| 2019/0015045 A1 | 1/2019 | Li | |
| 2019/0137947 A1 * | 5/2019 | Yaghmour | H01R 13/5219 |
| 2020/0000378 A1 | 1/2020 | Jayalath | |

OTHER PUBLICATIONS

Written Opinion received in PCT/GB2021/051088 dated Jul. 20, 2021.

Prosecution history and opposition of GB2594820 granted Mar. 15, 2022.

Search and Examination Report received in GB2594820 dated Jul. 29, 2021.

Third Party Observations received in GB 2006830.0 dated Apr. 21, 2021.

Search and Examination Report received in GB2585753 dated Jul. 29, 2021.

Defence and Counter Claim received in Claim No. IP-2022-000067 (patent litigation re: GB2594820) mailed Jul. 18, 2023.

Application Note: AZD034 Release 2 War%Play: Auto On/Off for portable devices, May 1, 2015, pp. 1-10, No. 3.1, Publisher: Azoteq.

* cited by examiner

ELECTRONICS MODULE FOR A WEARABLE DEVICE

The present invention is directed towards a controller, electronics module and wearable article and, in particular, a controller, electronics module and wearable article arranged to transition between different power modes.

BACKGROUND

Wearable articles can be designed to interface with a user of the article, and to determine information such as the user's heart rate, rate of respiration, activity level, and body positioning. The articles include electrically conductive pathways to allow for signal transmission between an electronics module for processing and communication and sensing components of the article. The wearable articles may be garments. Such garments are commonly referred to as 'smart clothing' and may also be referred to as 'biosensing garments' if they measure biosignals.

It is desirable to overcome at least some of the problems associated with the prior art, whether explicitly discussed herein or otherwise.

SUMMARY

According to the present disclosure there is provided a controller, an electronics module, a wearable article, and a method as set forth in the appended claims. Other features of the invention will be apparent from the dependent claims, and the description which follows.

According to a first aspect of the disclosure, there is provided a controller for a wearable article. The controller is arranged to operate in a first power mode and a second power mode. The first power mode consumes less power than the second power mode. The controller is arranged to transition from the first power mode to the second power mode in response to an input unit of the wearable article detecting an input event. In the second power mode, the controller is arranged to determine whether the wearable article is being worn, and, in response to determining that the wearable article is not being worn, the controller is arranged to transition from the second power mode to the first power mode.

In response to the input unit detecting an input event, the controller is arranged to transition from a first, lower, power mode to a second, higher, power mode. Beneficially, prior to the input unit detecting the input event, components of the wearable article such as the controller are operating in a first, low, power mode. This may mean that they are not supplied with power or only supplied with a minimal amount of power such as for refreshing an internal memory. This reduces unnecessary power consumption for the wearable article. Once the input event is detected, the controller wakes-up and determines if the wearable article is being worn. If the wearable article is not being worn, the controller returns to the first, low, power mode and thus unnecessary power consumption is avoided. This means that frequent charging or replacement of power sources for the wearable article is not required. Therefore, the present disclosure improves energy efficiency and reduces the environmental impact of the wearable article by providing improved mechanism for transitioning the controller between high power and low power states.

In response to determining that the wearable article is not being worn, the controller may be arranged to determine whether a predetermine time has elapsed. If the predetermined time has elapsed, the controller may be arranged to transition from the second power mode to the first power mode.

The controller may be arranged to transition from the first power mode to the second power mode in response to receiving a signal from the input unit. The signal may be received in response to an input event being detected by the input unit. The signal received from the input unit may be an interrupt signal.

In the second power mode, the controller may be arranged to poll the input unit to determine the type of input event that caused the generation of the signal. The controller may be arranged to remain in the second power mode or transition back to the first power mode depending on the type of input event.

In the second power mode the controller may be arranged to receive a signal from an electronics component of the wearable article and determine, from the signal, whether the wearable article is being worn.

The interface may further comprise a sensing interface which is arranged to receive a signal from the interface and supply a signal to the controller. A signal from the electronics component of the wearable electrode (e.g. an electrode) may be received by the interface which may then forward a signal to the sensing interface, which may then forward the signal to the controller. The sensing interface may perform operations such as analogue-to-digital conversion on the signal received from the interface. In this way, while the controller may receive a signal from the electronics component of the wearable article (e.g. an electrode), the signal may be received indirectly via the interface and sensing interface and processing operations may be performed prior to the controller receiving the signal.

In the second power mode, the controller may be arranged to wait a first predetermined time for a signal from the electronics component of the wearable article. If the signal is not received during the first predetermined time, the controller may be arranged to transition from the second power mode to the first power mode. The signal may be an interrupt signal.

The signal received from the electronics component during the first predetermined time may be a first signal. If the signal is received from the electronics component during the first predetermined time, the controller may be arranged to receive a second signal from an electronics component of the wearable article. The controller may be arranged to determine from the signal whether the wearable article is being worn. The electronics component providing the second signal may be different to the electronics component providing the first signal.

If the controller does not determine that the wearable article is being worn during a second predetermined time after the first signal is received from the sensing unit, the controller may be arranged to transition from the second power mode to the first power mode. The first signal may be an interrupt signal generated by the electronics component.

The electronics component of the wearable article may comprise a sensing unit such as an electrode.

In the second power mode, the controller may be operable to control a communicator of the wearable article to communicate with an external device. If the communicator receives a control signal from the external device, the controller may be arranged to remain in the second power mode or transition to the first power mode.

In the second power mode, the controller may be arranged to control a communicator of the wearable article to transmit data to an external device.

In the second power mode, the controller may be arranged to activate the electronics component.

According to a second aspect of the disclosure, there is provided an electronics module for a wearable article. The electronics module comprises the controller of the first aspect of the disclosure.

The electronics module may comprise an input unit arranged to detect an input event.

The input unit may be arranged to detect an object being brought into proximity with the electronics module. The input unit may comprise an antenna. The input unit may detect an object being brought into proximity with the electronics module as a result of a current being induced in the antenna. The current may be induced in the antenna as a result of a mobile device being brought into proximity with the electronics module. The mobile device may comprise an active antenna to induce the current in the antenna. An induced current in the antenna may cause the controller of the electronics module to wake-up from the first power mode and enter the second power mode.

The input unit may comprise a sensing unit. The sensing unit may be arranged to detect the object being brought into proximity with the electronics module. The sensing unit may be arranged to detect contact with a body of the wearer.

The sensing unit may comprise a motion sensor. The motion sensor may be arranged to detect the object being brought into proximity with the electronics module. That is, the sensing unit may be able to detect a "'tap" input caused by the object being tapped against the electronics module or a pocket or other holder in which the electronics module is located. The sensing unit is not required to be a motion sensor. Other forms of sensing units such as capacitive sensors, optical sensors, and ultrasound sensors may be used to detect a mobile device being brought into proximity with the electronics module. Preferred implementations use motion sensors particularly as motion sensors can utilised for additional tasks such as recognising and classifying motion activities (e.g. running, walking, swimming, cycling) performed by a user wearing the wearable article.

The electronics module may further comprise an interface arranged to communicatively couple with a sensing unit of the wearable article so as to receive a signal from the sensing unit. The interface may not be required for all aspects of the present disclosure. That is, the sensing unit may be contained within the electronics module.

The sensing unit may comprise a biosensing unit. The sensing units may comprise one or more components of a temperature sensor, a humidity sensor, a motion sensor, an electropotential sensor, an electroimpedance sensor, an optical sensor, and/or an acoustic sensor. Here, "component" means that not all of the components of the sensor may be provided in the wearable article or are required to be provided in the wearable article. The processing logic, power and other functionality may be provided in the electronics module/controller. The sensing unit may be an electrode.

The interface may comprise a sensing interface which is arranged to receive a signal from the interface and supply a signal to the controller. The input unit may be the sensing interface.

The controller may be arranged to receive a signal from the interface indicating a potential difference change being detected by the interface.

The controller may be arranged to transition from the first power mode to the second power mode in response to the controller receiving the signal from the interface indicating the potential difference change being detected by the interface. The input unit may therefore comprise the interface/sensing interface.

In the second power mode the controller may be arranged to wait a first predetermined time for the signal from the interface indicating the potential difference change being detected by the interface, and wherein if the signal is not received during the first predetermined time, the controller is arranged to transition from the second power mode to the first power mode.

The signal received from the interface during the first predetermined time may be a first signal, and wherein if the first signal is received from the sensing interface during the first predetermined time, the controller is arranged to receive a second signal from the sensing interface, and determine from the second signal whether the wearable article is being worn.

The electronics module may further comprise a communicator. In the second power mode, the controller may be arranged to control the communicator to transmit data to an external device.

According to a third aspect of the disclosure, there is provided a wearable article comprising the electronics module of the second aspect of the disclosure. The wearable article may be a garment.

According to a fourth aspect of the disclosure, there is provided a method performed by a controller for a wearable article. The method comprises transitioning from a first power mode to a second power mode in response to an input unit of the wearable article detecting an input event, wherein the first power mode consumes less power than the second power mode. In the second power mode, the method comprises: determining whether the wearable article is being worn; and in response to determining that the wearable article is not being worn, transitioning from the second power mode to the first power mode.

BRIEF DESCRIPTION OF THE DRAWINGS

Examples of the present disclosure will now be described with reference to the accompanying drawings, in which.

DETAILED DESCRIPTION

Figure 1:
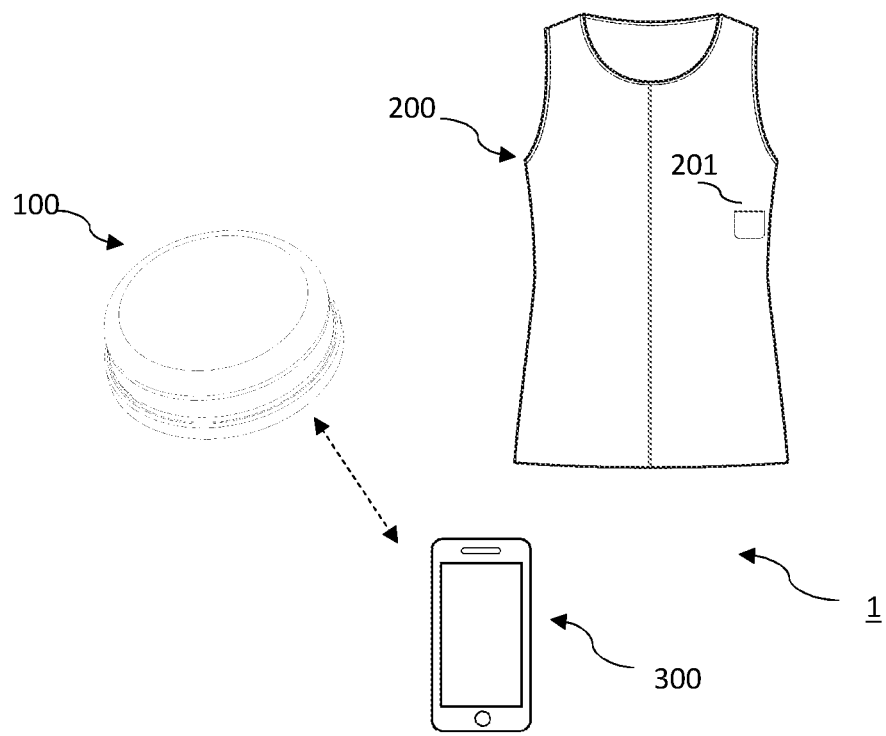
FIG. 1 shows a schematic diagram for an example system according to aspects of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

"Wearable article" as referred to throughout the present disclosure may refer to any form of article which may be worn by a user such as a smart watch, necklace, bracelet, or glasses. The wearable article may be a textile article. The wearable article may be a garment. The garment may refer to an item of clothing or apparel. The garment may be a top. The top may be a shirt, t-shirt, blouse, sweater, jacket/coat, or vest. The garment may be a dress, brassiere, shorts, pants, arm or leg sleeve, vest, jacket/coat, glove, armband, underwear, headband, hat/cap, collar, wristband, chestband, stocking, sock, or shoe, athletic clothing, personal protective equipment, swimwear, wetsuit or drysuit The garment may be a tight-fitting garment. Beneficially, a tight-fitting garment helps ensure that the sensor devices of the garment are held in contact with or in the proximity of a skin surface of the user. The garment may be a compression garment. The garment may be an athletic garment such as an elastomeric athletic garment.

The wearable article may be constructed from a woven or a non-woven material. The wearable article may be constructed from natural fibres, synthetic fibres, or a natural fibre blended with one or more other materials which can be natural or synthetic. The yarn may be cotton. The cotton may be blended with polyester and/or viscose and/or polyamide according to the particular application. Silk may also be used as the natural fibre. Cellulose, wool, hemp and jute are also natural fibres that may be used in the wearable article. Polyester, polycotton, nylon and viscose are synthetic fibres that may be used in the wearable article.

The following description refers to particular examples of the present disclosure where the wearable article is a garment. It will be appreciated that the present disclosure is not limited to garments and other forms of wearable article are within the scope of the present disclosure as outlined above.

Referring to FIG. 1, there is shown an example system 1 according to aspects of the present disclosure. The system 1 comprises an electronics module 100, a garment 200, and a mobile device 300.

The electronics module 100 is arranged to wirelessly communicate data to the mobile device 300. Various protocols enable wireless communication between the electronics module 100 and the mobile device 300. Example communication protocols include Bluetooth®, Bluetooth® Low Energy, and near-field communication (NFC).

The wearable article, in this example the garment 200 has sensing units provided on an inside surface which are held in close proximity to a skin surface of a user wearing the garment 200. This enables the sensing units to measure biosignals for the user wearing the garment 200.

The sensing units may be arranged to measure one or more biosignals of a user wearing the wearable article. Here, "biosignal" may refer to any signal in a living being that can be measured and monitored. The term "biosignal" is not limited to electrical signals and can refer to other forms of non-electrical biosignals. The sensing units may be used for measuring one or a combination of bioelectrical, bioimpedance, biochemical, biomechanical, bioacoustics, biooptical or biothermal signals of the user. The bioelectrical measurements include electrocardiograms (ECG), electrogastrograms (EGG), electroencephalograms (EEG), and electromyography (EMG). The bioimpedance measurements include plethysmography (e.g., for respiration), body composition (e.g., hydration, fat, etc.), and electroimpedance tomography (EIT). The biomagnetic measurements include magnetoneurograms (MNG), magnetoencephalography (MEG), magnetogastrogram (MGG), magnetocardiogram (MCG). The biochemical measurements include glucose/lactose measurements which may be performed using chemical analysis of the user's sweat. The biomechanical measurements include blood pressure. The bioacoustics measurements include phonocardiograms (PCG). The biooptical measurements include orthopantomogram (OPG). The biothermal measurements include skin temperature and core body temperature measurements. The sensing units may comprise a radar unit. The wearable article may sense a combination of external signals and biosignals of the user.

The sensing units may be garment electrodes as will be described further below in relation to FIG. 7. The sensing units may be other biomedical sensors. The garment 200 has an electronics module holder 201 in the form of a pocket 201. The pocket 201 is sized to receive the electronics module 100. When disposed in the pocket 201, the electronics module 100 is arranged to integrate with the sensor components of garment 200 and receive sensor data from the sensing units. The electronics module 100 is therefore removable from the garment 200. The present disclosure is not limited to electronics module holders 201 in the form pockets 201. Instead, other mechanism for releasably mechanically coupling the electronics module 100 to the garment 200 may be provided. The mechanical coupling of the electronics module 100 to the garment 200 may be provided by a mechanical interface such as a clip, a plug and socket arrangement, etc. The mechanical coupling or mechanical interface may be configured to maintain the electronics module 100 in a particular orientation with respect to the garment 200 when the electronics module 100 is coupled to the garment 200. This may be beneficial in ensuring that the electronics module 100 is securely held in place with respect to the garment 200 and/or that any electronic coupling of the electronic module 100 and the garment 200 (or a component of the garment 200) can be optimized. The mechanical coupling may be maintained using friction or using a positively engaging mechanism, for example.

Beneficially, the removable electronic module 100 may contain all of the components required for data transmission and processing such that the garment 200 only comprises the sensor units and communication pathways. In this way, manufacture of the garment 200 may be simplified. In addition, it may be easier to clean a garment 200 which has fewer electronic components attached thereto or incorporated therein. Furthermore, the removable electronic module 100 may be easier to maintain and/or troubleshoot than embedded electronics. The electronic module 100 may comprise flexible electronics such as a flexible printed circuit (FPC). The electronic module 100 may be configured to be electrically coupled to the garment 200.

The electronics module 100 can locally store the sensor data, perform processing operations of the sensor data, and transmits the raw or processed sensor data to an external apparatus such as mobile device 300.

The present disclosure is not limited to electronics modules 100 that communicate with mobile devices 300 and instead may communicate with any electronic device capable of communicating directly with the electronics module 100 or indirectly via a server over a wired or wireless communication network. The electronic device may be a wireless device or a wired device. The wireless/wired device may be a mobile phone, tablet computer, gaming system, MP3 player, point-of-sale device, or wearable device such as a smart watch. A wireless device is intended to encompass any compatible mobile technology computing device that connects to a wireless communication network, such as mobile phones, mobile equipment, mobile stations, user equipment, cellular phones, smartphones, handsets or the like, wireless dongles or other mobile computing devices. The wireless communication network is intended to encompass any type of wireless such as mobile/cellular networks used to provide mobile phone services.

Figure 2:
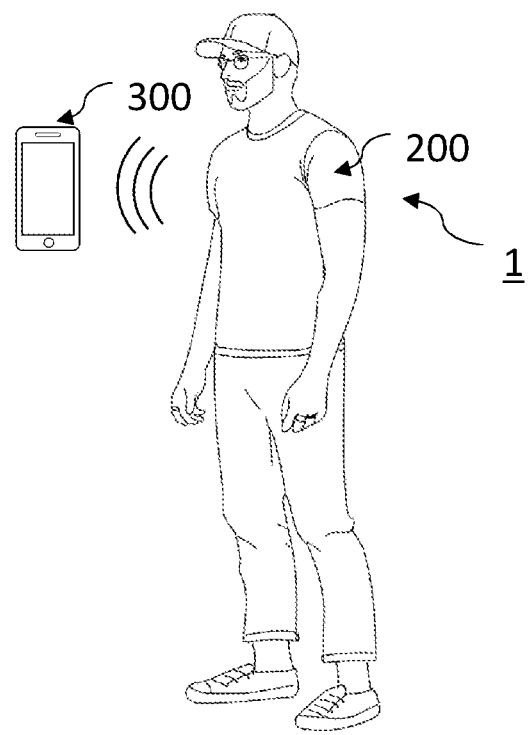
FIG. 2 shows a schematic diagram for another example system according to aspects of the present disclosure.

Referring to FIG. 2, there is shown another example system 1 according to aspects of the present disclosure. The system 1 comprises an electronics module hidden within a garment 200, and a mobile device 300. The garment 200 is worn by a user.

Figure 3:
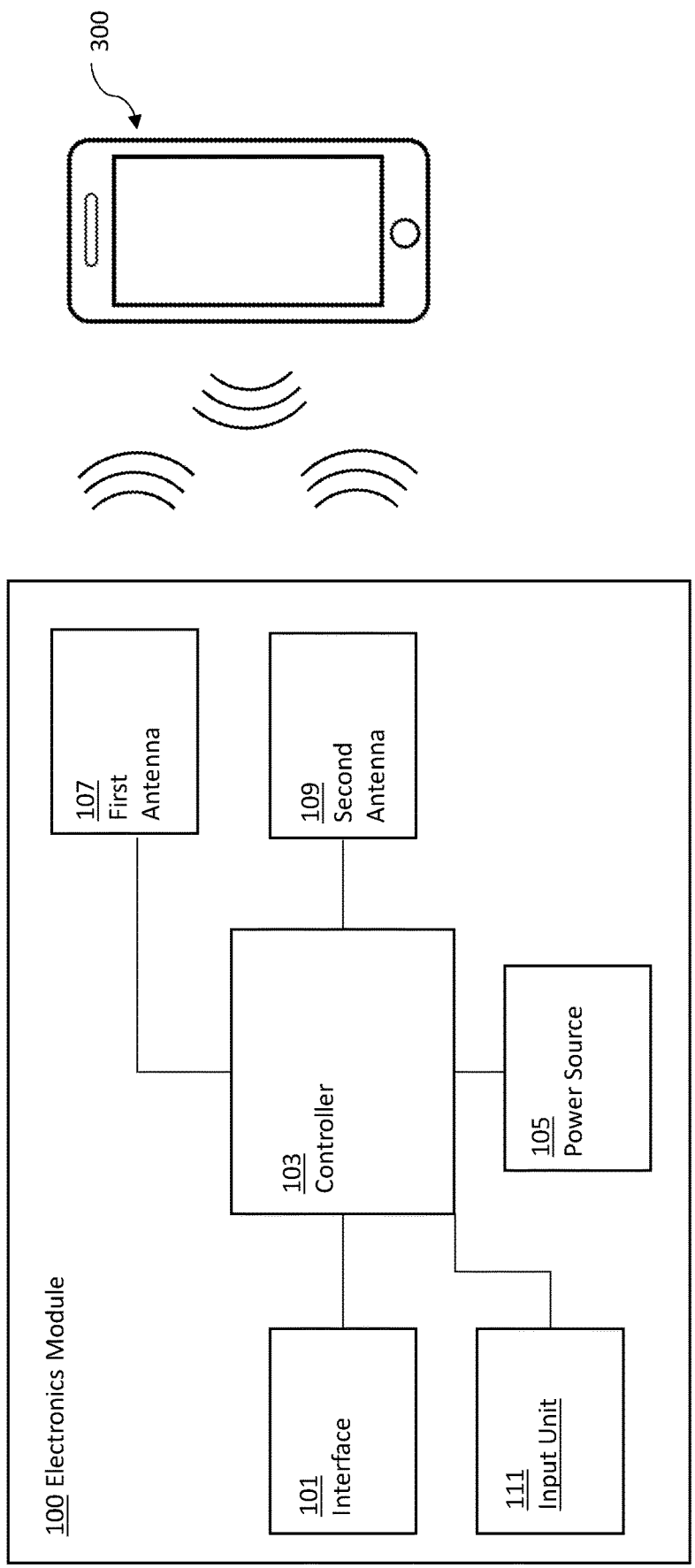
FIG. 3 shows a schematic diagram for an example electronics module according to aspects of the present disclosure.

Referring to FIG. 3, there is shown a schematic diagram of an example of the electronics module 100 of FIGS. 1 and 2. The electronics module 100 is shown in wireless communication with mobile device 300. The electronics module 100 comprises an interface 101, a controller 103, a power source 105, a first antenna 107, a second antenna 109, and input unit 111. It will be appreciated that the electronics module 100 is not required to have all of these components and may have only some of these components or may have additional components.

The interface 101 is arranged to communicatively couple with an electronics component such as the sensing unit of the wearable article 200 (FIGS. 1 and 2) so as to receive a signal from the sensing unit. The controller 103 is communicatively coupled to the interface 101 and is arranged to receive the signals from the interface 101. The interface 101 may form a conductive coupling or a wireless (e.g. inductive) communication coupling with the electronics components of the wearable article. The interface 101 is also arranged to receive sensor data from other electronics components, such as other biosignal sensors, as will be described further below and to couple this sensor data to the controller 103.

The power source 105 is coupled to the controller 103 and is arranged to supply power to the controller 103. The power source 105 may comprise a plurality of power sources. The power source 105 may be a battery. The battery may be a rechargeable battery. The battery may be a rechargeable battery adapted to be charged wirelessly such as by inductive charging. The power source 105 may comprise an energy harvesting device. The energy harvesting device may be configured to generate electric power signals in response to kinetic events such as kinetic events performed by a wearer of the garment. The kinetic event could include walking, running, exercising or respiration of the wearer. The energy harvesting material may comprise a piezoelectric material which generates electricity in response to mechanical deformation of the converter. The energy harvesting device may harvest energy from body heat of a wearer of the garment. The energy harvesting device may be a thermoelectric energy harvesting device. The power source may be a super capacitor, or an energy cell.

The first antenna 107 is arranged to communicatively couple with the mobile device 300 over a first wireless communication protocol. The first wireless communication protocol may be a near field communication (NFC) protocol but is not limited to any particular communication protocol. The second antenna 109 is arranged to communicatively couple with the mobile device 300 over a second wireless communication protocol. The second wireless communication protocol may be a Bluetooth® protocol or a Bluetooth® Low Energy protocol but is not limited to any particular communication protocol. The electronics module 100 is not required to have the first antenna 107 and the second antenna 109. Instead, a single communicator 107, 109 may be provided.

The communicator 107, 109 is not limited to transmitting over the wireless communication protocols described above. The communicator 107, 109 may be a mobile/cellular communicator operable to communicate the data wirelessly via one or more base stations. The communicator 107, 109 may provide wireless communication capabilities for the garment and enables the garment to communicate via one or more wireless communication protocols such as used for communication over: a wireless wide area network (VWVAN), a wireless metroarea network (VVMAN), a wireless local area network (VVLAN), a wireless personal area network (VVPAN), Bluetooth®Low Energy, Bluetooth®Mesh, Bluetooth®5, Thread, Zigbee, IEEE 802.15.4, Ant, a near field communication (NFC), a Global Navigation Satellite System (GNSS), a cellular communication network, or any other electromagnetic RF communication protocol. The cellular communication network may be a fourth generation (4G) LTE, LTE Advanced (LTE-A), LTE Cat-M1, LTE Cat-M2, NB-IoT, fifth generation (5G), sixth generation (6G), and/or any other present or future developed cellular wireless network. A plurality of communicators may be provided for communicating over a combination of different communication protocols.

The controller 103 is arranged to operate in a first power mode and a second power mode. The first power mode consumes less power than the second power mode. The first power mode may be referred to as a low power mode. The second power mode may be referred to as a normal or high power mode. In the first power mode, the controller 103 may not activate components of the electronics module 100 such as the first antenna 107 and the second antenna 109 to communicate with the mobile device 300. Moreover, the electronics component may not be activated to sense signals. Other features may be disabled/enabled in the first power mode/second power mode. The input unit 111 is operational during the first power mode but may operate in a restricted mode.

The controller 103 is arranged to transition from the first power mode to the second power mode in response to the input unit 111 of the electronics module 100 detecting an input event. An example input event includes an object being brought into proximity with the electronics module 100 such as the mobile device 300 or a hand of the user tapping against the electronics module 100.

When in the second power mode, the controller 103 is arranged to receive a signal from a sensing unit. The sensing unit is not shown in FIG. 3. The sensing unit may be a component of the electronics module 100. Alternatively, the sensing unit may be separate to the electronics module 100 and coupled to the electronics module 100 via the interface 101. Thus, the sensing unit may be incorporated into the garment. The sensing unit may be the sensing unit of the wearable article, such as the electrodes 209, 211 shown in FIG. 7. The sensing unit may comprise a combination of components of the electronics module 100 and components separate to the electronics module 100. The sensing unit may comprise a sensor interface of the electronics module 100 such as an analog-front-end which is coupled to sensing units such as electrodes in the garment. This may mean that the controller 103 indirectly receives signals from electrodes of the wearable article via the sensor interface. The controller 103 determines, from the received signal, whether the electronics module 100/garment 200 is being worn. If the electronics module 100/garment 200 is not being worn, the controller 103 is arranged to transition from the second power mode to the first power mode.

In an example operation, the user has positioned the electronics module 100 within the pocket 201 (FIG. 1) of the garment 200 and is wearing the garment 200. The user taps their hand or mobile phone 300 against the pocket 201 and this tap event is detected by the input unit 111. The input unit 111 sends a signal to the controller 103 to wake-up the controller 103 from the first power mode. The controller 103 then determines from signals received via the interface 101 that the electronics module 100 is being worn and thus remains in the second power mode. This enables the user to obtain the benefits of the functionality of the electronics module 100 while wearing the electronics module 100/garment 200.

In another example operation, the user is not wearing the electronics module 100. Instead, the electronics module 100 may be disposed within the user's luggage. Motion of the luggage (e.g. if the luggage is being carried by the user or stored in a vehicle) may cause the input unit 111 to detect a tap event. This causes the controller 103 to wake-up and thus the electronics module 100 consumes more power. If the controller 103 were to remain in the second power mode then unnecessary power drain may occur without the electronics module 100 obtaining, processing or transmitting useful sensor data. This may mean that the power source 105 of the electronics module 100 is more frequently depleted and may require more frequent charging and/or replacing by the user. This can increase the cost and environmental impact of the electronics module 100 while also increasing the frustration to the user and decreasing the utility of the electronics module 100.

Advantageously, according to aspects of the present disclosure, when the controller 103 wakes up from the first power mode, the controller 103 determines from signals received via the interface 101 whether the electronics module 100/garment 200 is being worn. If the electronics module 100 is not being worn, the electronics module 100/garment 200 transitions back to the first power mode. In this way, excess power drain does not occur when the electronics module 100/garment 200 is not being worn.

The input unit 111 may be any form of input unit capable of detecting an input event. The input event is typically and object being brought into proximity with the electronics module 100.

In some examples, the input unit 111 comprises a user interface element such as a button. The button may be a mechanical push button. The user interface element is activated when the object (e.g. mobile device 300) is brought into proximity with the input unit 111. Simply, the user may tap their hand or mobile device 300 against the outside surface of the electronics module 100 or the pocket 201 (FIG. 1) when the electronics module 100 is disposed within the pocket 201.

In some examples, the input unit 111 comprises the first antenna 107. In these examples, the input event is detected by a current being induced in the first antenna 107. The mobile device 300 is powered to induce a magnetic field in an antenna of the mobile device 300. When the mobile device 300 is placed in the magnetic field of the first antenna 107, the mobile device 300 induces current in the first antenna 107. This induced current is detectable by the controller 103 while operating the first power mode and used to transition the controller 103 from the first power mode to the second power mode.

In some examples, the input unit 111 comprises a sensor 111 such as a proximity sensor or motion sensor.

In some examples, the sensor 111 is a motion sensor that is arranged to detect a displacement of the electronics module 100 caused by an object being brought into proximity with the electronics module 100. These displacements of the electronics module 100 may be caused by the object being tapped against the electronics module 100. Physical contact between the object and the electronics module 100 is not required as the electronics module 100 may be in a holder such as a pocket of the garment 200. This means that there may be a fabric (or other material) barrier between the electronics module 100 and the object. In any event, the object being brought into contact with the fabric of the pocket will cause an impulse to be applied to the electronics module 100 which will be sensed by the sensor 111.

The sensor 111 may comprise an inertial measurement unit. The inertial measurement unit may comprise an accelerometer and optionally one or both of a gyroscope and a magnetometer. A gyroscope/magnetometer is not required in all examples, and instead only an accelerometer may be provided or a gyroscope/magnetometer may be present but put into a low power state. A processor of the sensor 111 may perform processing tasks to classify different types of detected motion. The processor of the sensor 111 may, in particular, perform machine-learning functions so as to perform this classification. Performing the processing operations on the sensor 111 rather than the controller 103 is beneficial as it reduces power consumption and leaves the controller 103 free to perform other tasks. In addition, it allows for motion events to be detected even when the controller 103 is operating in the first, low power, mode. The sensor 111 communicates with the controller 103 over a serial protocol such as the Serial Peripheral Interface (SPI), Inter-Integrated Circuit (I2C), Controller Area Network (CAN), and Recommended Standard 232 (RS-232). Other serial protocols are within the scope of the present disclosure. The sensor 111 is also able to send interrupt signals to the controller 103 when required so as to transition the controller 103 from a first power model to a second power mode when a motion event is detected. The interrupt signals may be transmitted via one or more dedicated interrupt pins.

In an example operation, the electronics module 100 is initially operating in a first power mode. In this first power mode, the majority of the components of the electronics module 100 are not operating so as to save power. For example, the first antenna 107 and second antenna 109 are not energized to transmit data and the controller 103 is operating in a first, low power, mode and is not activated to process signal data received via the interface 101. Moreover, in the lower power mode, the controller 103 may not store data in an internal memory of the electronics module 100. Once in the second power mode, the controller 103 may receive and process sensor data, communicate with external devices and store data in a local memory amongst others. The second power mode consumes more power than the first power mode.

Once in the second power mode, the controller 103 may also control the first antenna 107 to transmit information to the mobile device 300 over a first wireless communication protocol to facilitate pairing between the mobile device and the second antenna 109 over a second wireless communication protocol. The first wireless communication protocol may be NFC and the second wireless communication protocol may be Bluetooth®.

The information may comprise a unique identifier for the electronics module 100. The unique identifier for the electronics module 100 may be an address for the electronics module 100 such as a MAC address or Bluetooth® address. Beneficially, transmitting a unique identifier for the electronics module 100 removes the need for a discovery or inquiry procedure to establish a communication session under the second wireless communication protocol.

The information may comprise authentication information used to facilitate the pairing between the electronics module 100 and the mobile device 300 over the second wireless communication protocol. This means that the transmitted information is used as part of an out of band (OOB) pairing process.

The information may comprise application information which may be used by the mobile device to start an application on the mobile device 300 or configure an application running on the mobile device 300. The application may be started on the mobile device automatically (e.g. without user input). Alternatively, the application information may cause the mobile device 300 to prompt the user to start the application on the mobile device 300. The information may comprise a uniform resource identifier such as a uniform resource location to be accessed by the mobile device 300, or text to be displayed on the mobile device 300 for example.

In a preferred example, the controller 103 controls the first antenna 107 to transmit a unique identifier to the mobile device 300. In response, the mobile device 300 transmits a pairing request message to the electronics module 100. The second antenna 109 of the electronics module 100 receives the paring request message from the mobile device 300. It will be appreciated that the second antenna 109 may receive the pairing request message when the mobile device 300 is no longer in proximity with the electronics module 100. This is because the second wireless communication protocol has a longer communication range than the first wireless communication protocol. The controller 103 of the electronics module 100 then processes the pairing request message and transmits a pairing response message in reply via the second antenna using the second wireless communication protocol. Pairing is then performed between the electronics module 100 and the mobile device 300. For OOB pairing, the mobile device 300 will still need to be in communication range with the electronics module 100 under the first wireless communication protocol.

The sensor 111 is supplied with power during the first power mode and is arranged to sense motion data. The sensor 111 may not have full functionality in the first power mode and may only have the necessary processing power to classify motion events into simple categories such as whether a tap has occurred. More computationally expensive processing operations may be disabled during the first power mode.

In response to the sensor 111 detecting a tap event, the sensor 111 sends an interrupt to the controller 103. As a result, the controller 103 wakes up from the first power mode and polls the sensor 111 to determine the reason for the interrupt being sent. The sensor 111 responds with a signal indicating that a tap has been detected. If another form of input was detected, the sensor 111 may send a different form of signal, and the controller 103 may transition back to the first power mode.

If the controller 103 receives a signal indicating that a tap has been detected, the controller 103 enables sensor data to be received via the interface 101 and processes the sensor data to determine whether the garment 200 is being worn. If the garment 200 is not being worn, the controller 103 transitions from the second power mode back to the first power mode. In this way, the operation of the electronics module 100 may be reduced such that, for example, only the sensor 111 is activated to detect motion events.

Generally, the controller 103 once transitioned to the second power mode will wait a predetermined period of time for signals from the interface 101 indicating that the garment 200/electronics module 100 is being worn. This may be to allow time for the user to position the electronics module 100 in the pocket 201 (FIG. 1) of the garment 200 or to allow time for good contact between sensing electrodes of the sensing unit and the skin surface to be established. Thus, once the controller 103 has transitioned to the second power mode, the controller 103 may start a timer. The controller 103 may then transition back to the first power mode if the controller 103 does not determine that the electronics module 100/garment 200 is being worn before the predetermined time period of the timer has elapsed.

The predetermined period of time may be any time period as appropriately selected by a skilled person in the art based on factors such as the power source 105 and the intended application of the electronics module 100. For example, different requirements may be put in place if the electronics module 100 is to be used in a healthcare or military setting as compared to a consumer setting. In some examples, the predetermined period of time may be 10 minutes or less, 9 minutes of less, 8 minutes of less, 7 minutes or less, 6 minutes or less, 5 minutes or less, 4 minutes or less, 3 minutes or less, 2 minutes or less, or 1 minute or less. The predetermined period of time may be between 1 second and 1 minute, 10 seconds and 1 minute, 20 seconds and 1 minute, 30 seconds and 1 minute, 40 seconds and 1 minute, or 50 seconds and 1 minute. The predetermined period of time may be between 1 second and 10 seconds, 1 second and 5 seconds or 5 seconds and 10 seconds.

The sensor data used to detect whether the electronics module 100/garment 200 is being worn may be any form of biosignal data as described above. Particular examples include sensor data obtained from bioelectrical, bioimpedance, optical, temperature or humidity sensors. Generally, bioelectrical or bioimpedance sensors such as electrocardiogram (ECG) and electromyography (EMG) sensors will generate signals with characteristics properties when the sensors are in contact with a user. For example, when ECG electrodes are in contact with a skin surface of the user they generate a distinctive voltage profile that can be used to determine that the electronics module 100/garment 200 is being worn. Similarly, photoplethysmography (PPG) sensors will generate distinctive signals when recording signals from a user. Temperature sensors such as skin surface temperate or core body temperature sensors and humidity sensors will also output temperature/humidity values that are indicative of whether the electronics module 100/garment 200 is being worn. Generally, any form of electronics component such as a sensing unit that can generate signals indicative of whether the electronics module 100/garment 200 is being worn can be used in accordance with the present disclosure. Detecting whether the electronics module 100/garment 200 is being worn is generally the same as performing liveness detection.

Figure 4:
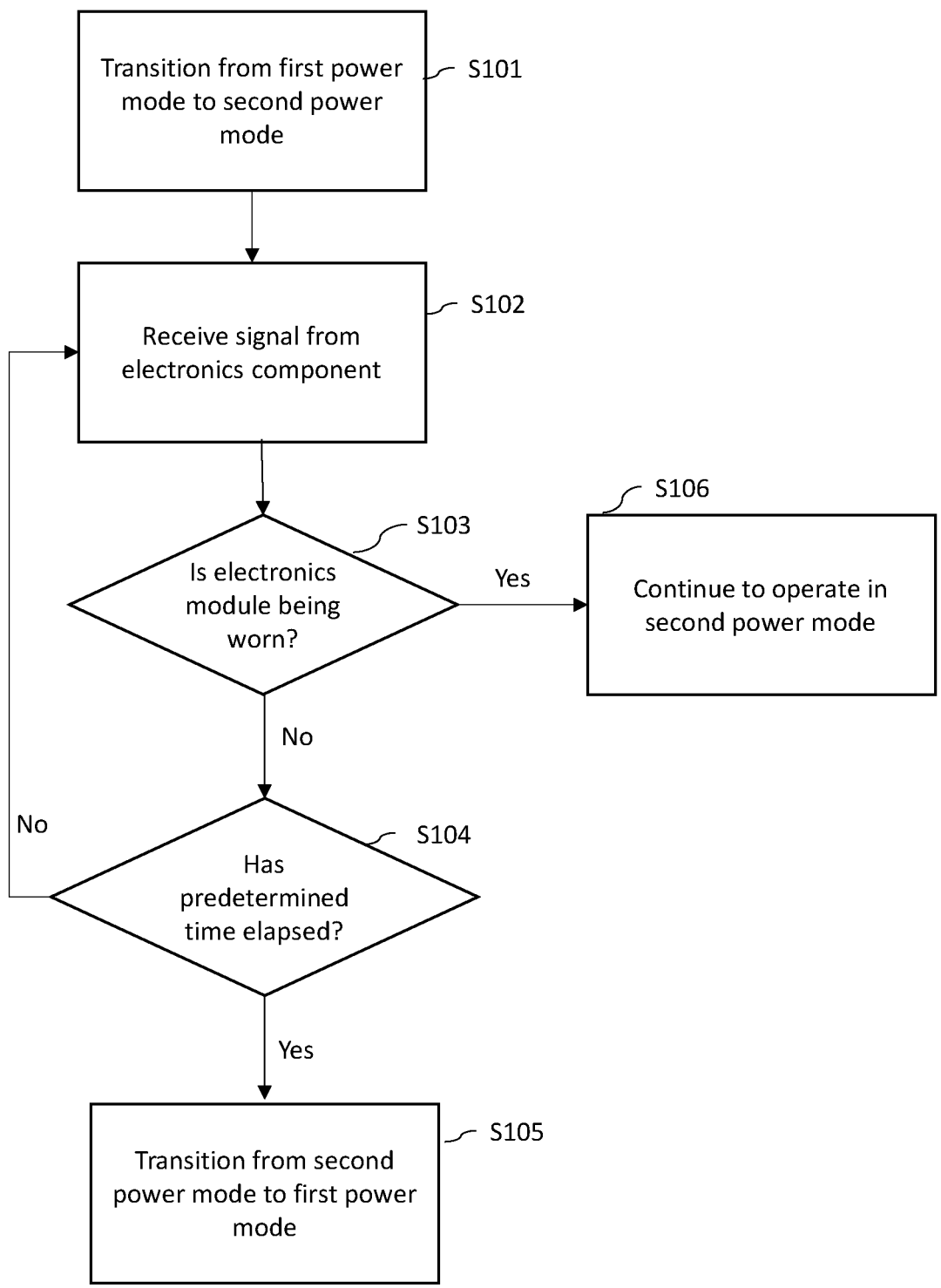
FIG. 4 shows a flow diagram for an example method according to aspects of the present disclosure.

Referring to FIG. 4, there is shown a process flow diagram for an example method according to aspects of the present disclosure. The method is performed by the controller 103 (FIG. 3) of the electronics module 100.

Step S101 comprises transitioning from a first power mode to a second power mode in response to an input unit of the electronics module detecting an input event.

Step S102 comprises receiving a signal from the sensing unit while operating in the second power mode.

Step S103 comprises determining from the signal whether the electronics module is being worn. If the electronics module is not determined to be worn, the method proceeds to step S104. If the electronics module is determined to be worn, the method proceeds to step S106.

Step S104 comprises determining whether a predetermined time since transitioning to the second power mode has elapsed. Once the controller 103 transitions to the second power mode, the controller 103 starts a timer for a predetermined time period. If the timer elapses without the controller 103 determining that the electronics module is being worn, the method proceeds to step S105. In step S105 the controller 103 transitions back from the second power mode to the first power mode. If the timer has not yet elapsed, the method returns to step S102.

Step S106 comprises continuing the controller 103 to operate in the second power mode.

Figure 5:
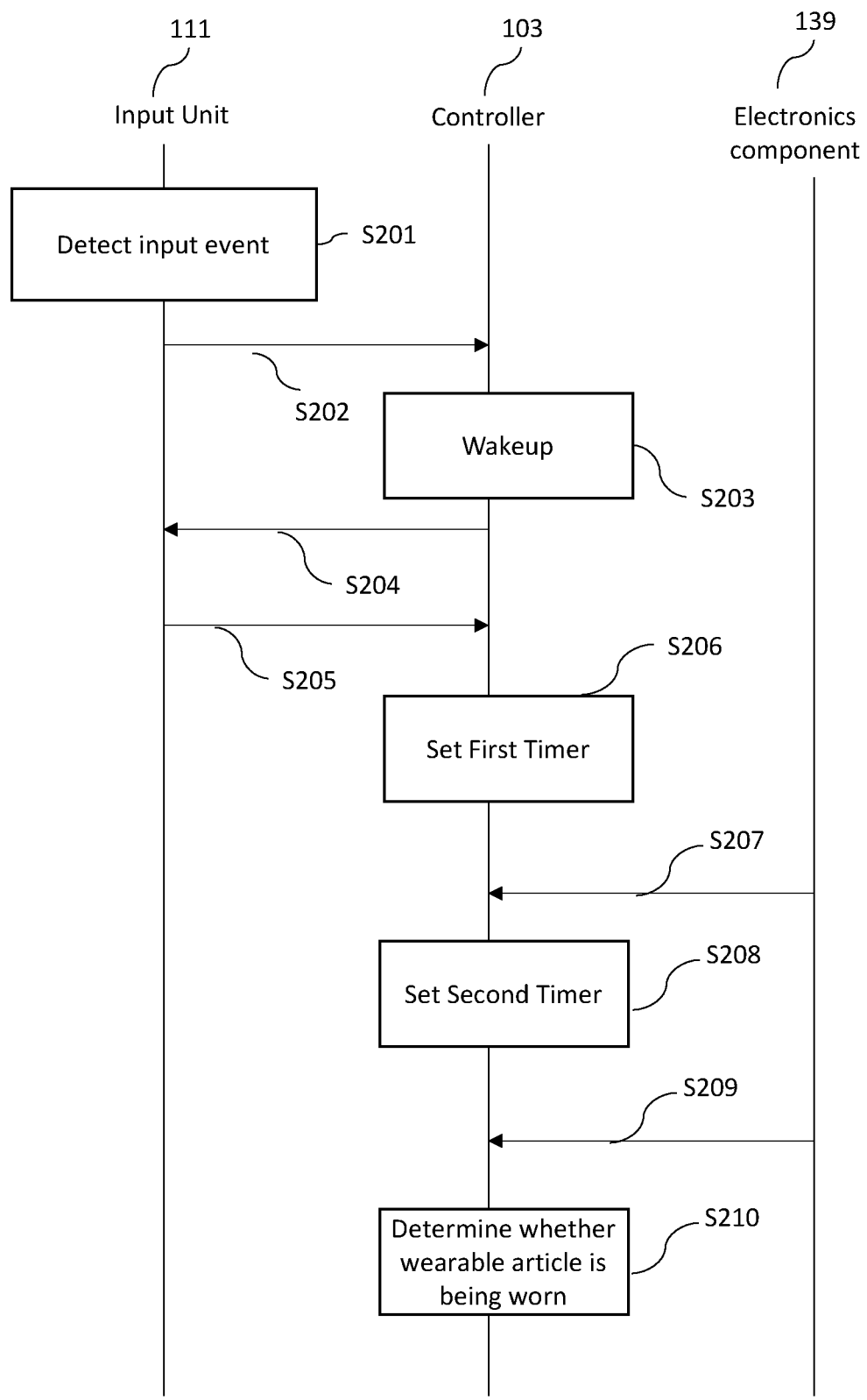
FIG. 5 shows a swim lane diagram for another example method according to aspects of the present disclosure.

Referring to FIG. 5, there is shown a swim lane diagram showing an example interaction between an input unit 111, controller 103, and sensing interface 139. In this example, the input unit 111, controller 103, and sensing unit 139 are all components of the electronics module 100. The sensing interface 139 in this example is an analog-front-end 139 that receives signals from electrodes incorporated in the garment 200 via interface 101 (FIG. 3). The electrodes are for recording electrocardiography (ECG) signals. The sensing interface may be considered as the electronics component/sensing unit or part of the electronics component/sensing unit.

In step S201, the input unit 111 detects an input event caused by an object such mobile device 300 being brought into proximity with the electronics module 100.

In step S202, the input unit 111 transmits an interrupt signal to the controller 103 over a dedicated interrupt pin.

In step S203, the controller 103 wakes-up from a first power mode in response to receiving the interrupt signal.

In step S204 the controller 103 sends a status request to the input unit 111 over a serial communication interface.

In step S205, the input unit 111 transmits a status response back to the controller 103 over the serial communication interface. From the status response, the controller 103 determines that an object has been brought into proximity with the electronics module 100. As a result, the controller 103 in step S206 starts a first timer.

During the running of the first timer, the controller 103 waits for an interrupt signal from the sensing interface 139. The interrupt signal is sent from the sensing interface 139 to the controller 103 in response to the sensing interface 139 detecting a potential difference change via the interface 101. The potential difference change may signify that the interface 101 is connected to electrodes of the garment 200 or that the interface 101 is in contact with a body of the wearer. This may be referred to as a body-detect signal or a leads-on signal.

Even if the body-detect signal is received, the electronics module 100 may still not be correctly worn by the user and thus may not be receiving useful ECG (in this case) data. For example, the electronics module 100 may be held in the palm of the user's hand and may not yet be attached to the garment 200 so as to receive ECG signals from electrodes incorporated into the garment 200.

To this end, after receiving the interrupt signal from the sensing interface 139 in step S207, the controller 103 sets a second timer in step S208 and waits for signals from the sensing interface 139. The controller 103 receives signal(s) from the sensing unit 139 in step S209 and determines from the signal(s) whether the electronics module 100 is being worn in step S210. This may involve determining whether the received signal(s) have the expected properties of ECG signals. If the signal(s) do have the properties of ECG signals then the controller 103 determines that the electronics module 100 is being correctly worn. If the received signal(s) do not have the expected properties of ECG signals, then the controller 103 determines that the electronics module 100 is not being correctly worn.

The first and second timers may be for any time period as appropriately selected by a skilled person in the art based on factors such as the power source 105 and the intended application of the electronics module 100. In some examples, the first and second timers may be for a time period of 10 minutes or less, 9 minutes of less, 8 minutes of less, 7 minutes or less, 6 minutes or less, 5 minutes or less, 4 minutes or less, 3 minutes or less, 2 minutes or less, or 1 minute or less. The first and second timers may be for a time period of between 1 second and 1 minute, seconds and 1 minute, 20 seconds and 1 minute, 30 seconds and 1 minute, 40 seconds and 1 minute, or 50 seconds and 1 minute. The first and second timers may be for a time period of between 1 second and 10 seconds, 1 second and 5 seconds or 5 seconds and 10 seconds. The first and second timers are not required to be the same. The first timer may be for a longer duration than the second timer. For example, the first timer may be 2 minutes and the second timer may be 10 seconds.

If the first timer elapses without the controller 103 receiving the body detect signal, then the controller 103 transitions back to the first power mode. Similarly, if the second timer elapses without the controller 103 determining that the electronics module 100/garment 200 is being worn, the controller 103 transitions back to the first power mode.

In some examples to the present disclosure, while operating in the second power mode, the controller 103 may receive a signal transmitted by an external device such as mobile device 300. This signal may cause the controller 103 to remain in the second power mode even if the controller 103 does not determine that the electronics module 100/garment 200 is being worn.

This enables a user to remotely control the electronics module 100 using an external device to perform functions such as software/firmware updating, configuration and data transfer.

In some examples, the input unit 111 used to detect the input event and the electronics component/sensing interface 139 used to determine whether the garment is being worn are the same component.

For example, the controller 103 may be arranged to transition from the first power mode to the second power mode in response to the sensing interface 139 detecting an input event. The input event may be a potential difference detected by the sensing interface 139. The potential difference change may signify that the interface 101 is connected to electrodes of the garment 200 or that the interface 101 is in contact with a body of the wearer. This may be referred to as a body-detect signal or a leads-on signal. The sensing interface 139 may generate an interrupt signal in response to detecting the input event. After receiving the interrupt signal from the sensing interface 139, the controller 103 waits for signals from the sensing interface 139. The controller 103 receives signal(s) from the sensing unit 139 and determines from the signal(s) whether the electronics module 100 is being worn. This may involve determining whether the received signal(s) have the expected properties of ECG signals. If the signal(s) do have the properties of ECG signals, then the controller 103 determines that the electronics module 100 is being correctly worn. If the received signal(s) do not have the expected properties of ECG signals, then the controller 103 determines that the electronics module 100 is not being correctly worn.

Figure 6:
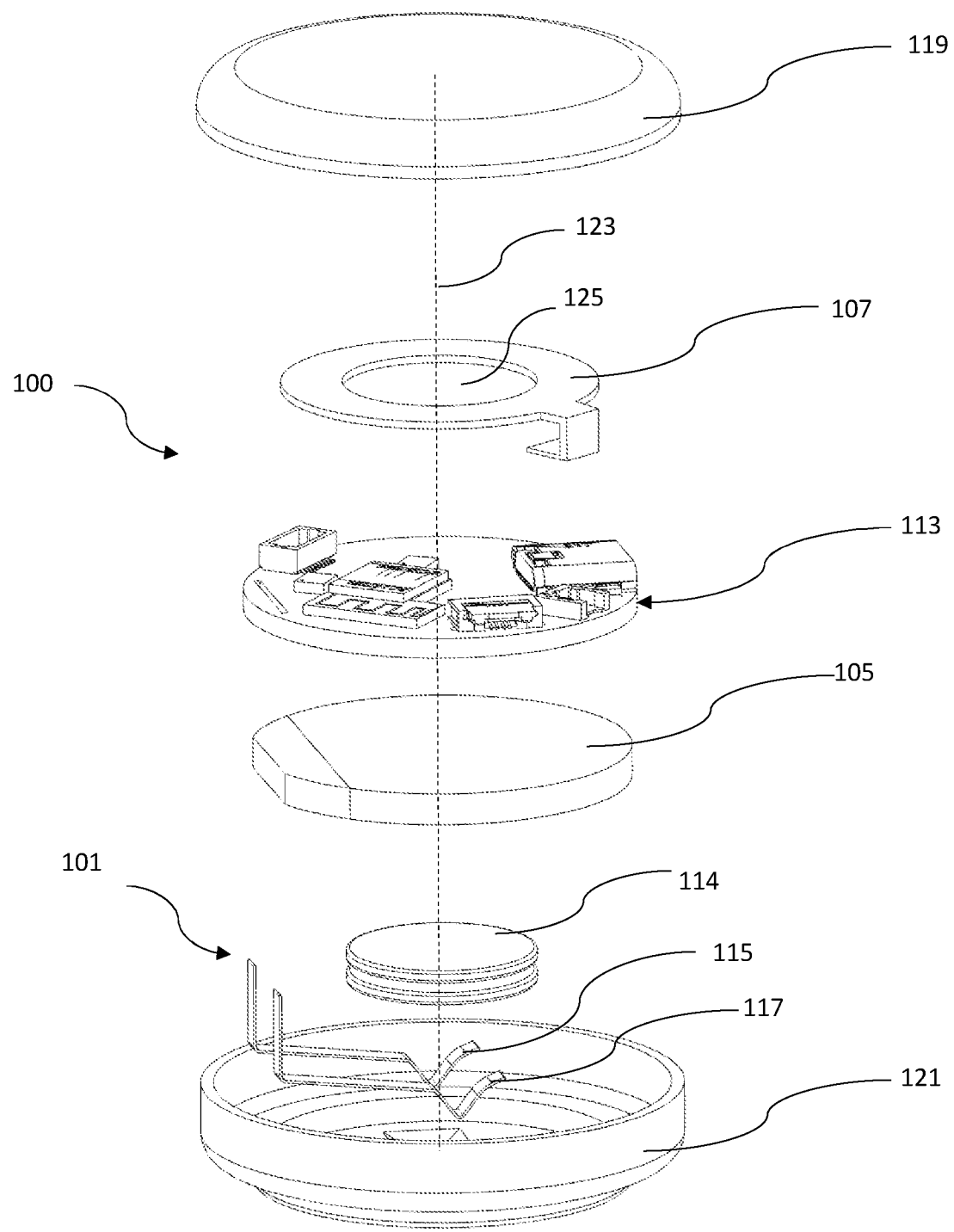
FIG. 6 shows an exploded view of another example electronics module according to aspects of the present disclosure.

Referring to FIG. 6, there is shown an exploded view of an example electronics module 100 according to aspects of the present disclosure. The electronics module 100 comprises a first antenna 107, printed circuit board 113, power source 105, and interface 111. The interface 111 comprises a magnet 114, and two conductive prongs 115, 117. The electronics module 100 may be the electronics module 100 of FIG. 3, but this is not required. For example, the first antenna 107 may not be a communication antenna but may instead be a power receiving antenna such as a power receiving coil. In these examples, the first antenna 107 would be used to receive power from an external device for charging the power source 105.

The components of the electronics module 100 are provided within a housing formed of a top enclosure 119 and a bottom enclosure 121. A longitudinal axis 123 extends from the top enclosure 119 to the bottom enclosure 121. The first antenna 107 is provided proximate to the top enclosure 119. The bottom enclosure 121 is closest to the body of the wearer in use and the top enclosure 119 is furthest away from the body of the wearer in use. Beneficially, providing the first antenna 107 proximate to the top enclosure 119 minimises the communication distance between the first antenna 107 and the mobile device. This is particularly beneficial when the first antenna 107 is a short-range communication antenna 107 such as an NFC antenna 107.

The printed circuit board 113 comprises the controller 103, second antenna 109, and sensor 111. The first antenna 107 is spaced apart from the printed circuit board 113 and the power source 105 along the longitudinal axis 123 of the housing and is therefore spaced apart from the power source 105, controller 103, second antenna 109, and sensor 111. This further helps reduces the communication distance between the first antenna 107 and the mobile device 300.

The first antenna 107 comprises an aperture 125. That is, the first antenna 107 has an annular shape with a central aperture 125. The second antenna 109 and the first antenna 107 are arranged such that the second antenna 109 has line of sight through the aperture 125. This means that the second antenna 109 is positioned on the printed circuit board 113 at a central position which is aligned with the aperture 125 of the first antenna 107. The printed circuit board 113 may additionally comprise a light source (not shown). The light source may be positioned on the printed circuit board 113 such that it has line of sight through the aperture 125.

The housing 119, 121 has a circular cross-sectional shape in the example of FIG. 6 but this is not required. The housing may have any cross-sectional shape such as oval, square or rectangular.

In the example of FIG. 6, the first antenna 107 and the printed circuit board 113 are shown as two separate structures. This is not required in all implementations of the present disclosure. Instead, the first antenna 107 and the printed circuit board 113 may be formed from the same printed circuit board structure.

The use of conductive prongs 115, 117 to electrically conductively connect the electronics module 100 to the textile are not required in all aspects of the present disclosure. Other forms of conductive connection may be provided such as via conductive studs, pads or pins. In addition, a conductive connection may not be required as a wireless communication connection may be formed between the electronics module 100 and electronics components of the textile to allow for data exchange between the electronics module 100 and the electronics components of the textile. In one example, the electronics module 100 comprises an NFC antenna such as an NFC coil proximate to the bottom enclosure 121 and the textile material comprises a corresponding NFC coil These NFC coils form a communicative coupling when the electronics module 100 is brought into proximity with the textile to allow for data exchange.

Figure 7:
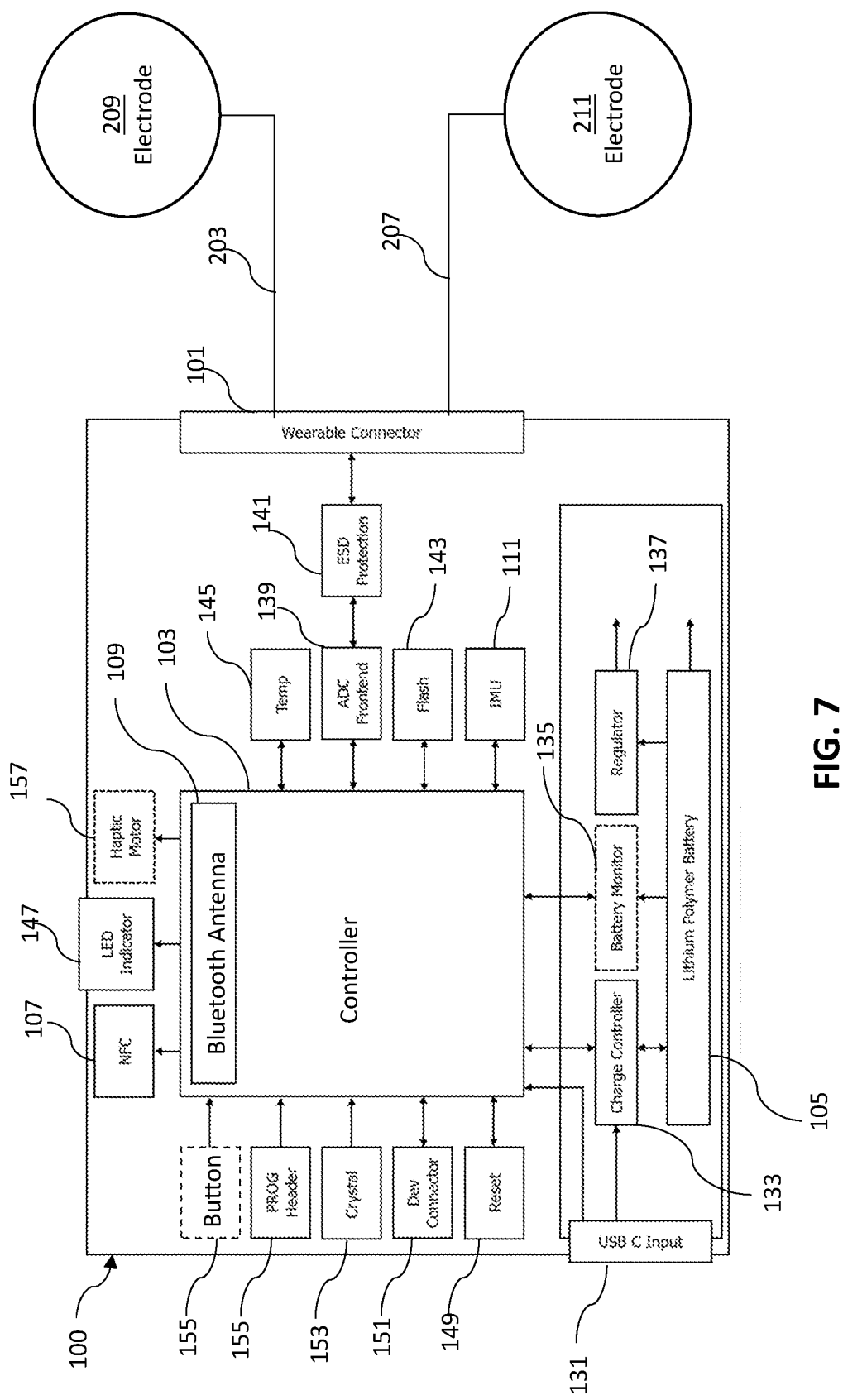
FIG. 7 shows a detailed schematic diagram of the electronics components of an example electronics module and garment according to aspects of the present disclosure.

Referring to FIG. 7, there is shown a detailed schematic diagram of an electronics module 100 according to example aspects of the present disclosure. The electronics module 100 comprises an interface 101, a controller 103, power source 105, first antenna 107, a second antenna 109, and a sensor 111. These components may be the same as the electronics module 100 described above. The electronics module 100 is mounted on a garment and conductively connected to a first electrode 209 and a second electrode 211 of the garment via the first and second electrically conductive pathways 203, 207. In a particular example, the electrodes 209, 211 are used to measure electropotential signals such as electrocardiogram (ECG) signals.

The controller 103 is a microcontroller with an integral second antenna 109 for communication over the second wireless communication protocol. The second antenna 109 in this example is a Bluetooth® antenna 109. The controller 103 is communicatively connected to the first antenna 107 which in this example is an NFC antenna 107. The controller 103 is arranged to energize the first antenna 107 to transmit information.

The power source 105 in this example is a lithium polymer battery 105. The battery 105 is rechargeable and charged via a USB C input 131 of the electronics module 100. Of course, the present disclosure is not limited to recharging via USB and instead other forms of charging such as inductive of far field wireless charging are within the scope of the present disclosure. Additional battery management functionality is provided in terms of a charge controller 133, battery monitor 135 and regulator 147. These components may be provided through use of a dedicated power management integrated circuit (PMIC). The controller 103 is communicatively connected to the battery monitor 135 such that the controller 103 may obtain information about the state of charge of the battery 105.

The controller 103 is connected to the interface 101 via an analog-to-digital converter (ADC) front end 139 and an electrostatic discharge (ESD) protection circuit 141. The ADC front end 139 converts the raw analog signal received from the electrodes 209, 211 into a digital signal. The ADC front end 139 may also perform filtering operations on the received signals.

The controller 103 has an internal memory and is also communicatively connected to an external memory 143 which in this example is a NAND Flash memory. The memory 143 is used to for the storage of data when no wireless connection is available between the electronics module 100 a mobile device 300 (FIG. 1). The memory 143 may have a storage capacity of at least 1 GB and preferably at least 2 GB. The electronics module 100 comprises a temperature sensor 145 and a light emitting diode 147 for conveying status information. The electronic module 100 also comprises conventional electronics components including a power-on-reset generator 149, a development connector 151, a crystal 153, and a PROG header 155. Additionally, the electronics module 100 may comprise a button 155 for allowing the user to control the electronics module 100 although this is not required due to the functionality of the motion sensor 111 as described previously. Additionally, the electronics module 100 may comprise a haptic feedback unit 157 for providing a haptic (vibrational) feedback to the user.

In some examples, the electronics module 100 may additionally comprise a mobile/cellular communicator operable to communicate the data wirelessly via one or more base stations. The communicator may provide wireless communication capabilities for the garment and enables the garment to communicate via over a cellular communication network. The cellular communication network may be a fourth generation (4G) LTE, LTE Advanced (LTE-A), LTE Cat-M1, LTE Cat-M2, NB-IoT, fifth generation (5G), sixth generation (6G), and/or any other present or future developed cellular wireless network. The first antenna 107 provided with an aperture 125 as described above in relation to FIG. 6 may be beneficial in allowing for a line-of-sight to be provided for the cellular communication of the electronics module 100.

The electronics module 100 may additionally comprise a Universal Integrated Circuit Card (UICC) that enables the garment to access services provided by a mobile network operator (MNO) or virtual mobile network operator (VMNO). The UICC may include at least a read-only memory (ROM) configured to store an MNO or VMNO profile that the garment can utilize to register and interact with an MNO or VMNO. The UICC may be in the form of a Subscriber Identity Module (SIM) card. The electronics module 100 may have a receiving section arranged to receive the SIM card. In other examples, the UICC is embedded directly into a controller of the electronics module 100. That is, the UICC may be an electronic/embedded UICC (eUICC). A eUICC is beneficial as it removes the need to store a number of MNO profiles, i.e. electronic Subscriber Identity Modules (eSIMs). Moreover, eSIMs can be remotely provisioned to garments. The electronics module 100 may comprise a secure element that represents an embedded Universal Integrated Circuit Card (eUICC).

In the present disclosure, the electronics module may also be referred to as an electronics device or unit. These terms may be used interchangeably.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An electronics module for a wearable article, the electronics module comprising:
   an input unit comprising a motion sensor arranged to detect an input event indicative of a wearable device being brought into proximity with the electronics module; a communicator that communicates with the wearable device; and
   a controller arranged to operate in a first power mode in which components of the electronics module lack full functionality and a second power mode,
   wherein the first power mode consumes less power than the second power mode, and
   wherein the controller is arranged to transition from the first power mode to the second power mode in response to the input unit detecting the input event,
   wherein, when in the second power mode, the controller is arranged to control the communicator, and the electronics module is arranged to receive a control signal from the wearable device, which in response to receipt of the control signal, the controller may remain in the second power mode or transition to the first power mode.

2. The electronics module according to claim 1, wherein the controller is arranged to transition from the first power mode to the second power mode in response to receiving a signal from the input unit, the signal being received in response to an input event being detected by the input unit, wherein, when in the second power mode, the controller is arranged to poll the input unit to determine the type of input event that caused the generation of the signal, and wherein the controller is arranged to remain in the second power mode or transition back to the first power mode depending on the type of input event.

3. The electronics module according to claim 2, wherein the signal received from the input unit is an interrupt signal.

4. The electronics module of claim 1, wherein in the second power mode, the controller is arranged to control the communicator of the electronics module to transmit data to an external device.

5. The electronics module of claim 1, wherein the communicator comprises an antenna arranged to communicatively couple with the wearable device over a wireless communication protocol.

6. The electronics module of claim 5, wherein the wireless communication protocol is a short-range communication protocol.

7. The electronics module of claim 6, wherein the short-range communication protocol is a near-field communication protocol.

8. The electronics module of claim 5, wherein the antenna is a near-field communication antenna.

9. The electronics module of claim 1, wherein the motion sensor is arranged to detect a tap event caused by an object being tapped against the electronics module.

10. The electronics module of claim 1, wherein the input event is caused by the wearable device being brought into proximity with the electronics module.

11. The electronics module of claim 1, wherein the electronics module further comprises a power source.

12. The electronics module of claim 11, wherein the power source comprises a rechargeable battery.

13. The electronics module of claim 1, wherein in the second power mode, the controller is arranged to determine whether the wearable article is being worn, and in response to determining that the wearable article is not being worn, the controller is arranged to transition from the second power mode to the first power mode.

14. The electronics module of claim 13, wherein in response to determining that the wearable article is not being worn, the controller is arranged to determine whether a predetermined time has elapsed and, if the predetermined time has elapsed, transition from the second power mode to the first power mode.

15. The electronics module of claim 1, wherein the motion sensor comprises an accelerometer.

* * * * *